United States Patent [19]

Ellinghorst et al.

[11] Patent Number: 4,865,743
[45] Date of Patent: Sep. 12, 1989

[54] METHOD FOR PRODUCTION OF SOLUTION-DIFFUSION MEMBRANES AND THEIR APPLICATION FOR PERVAPORATION

[75] Inventors: Guido Ellinghorst, Overath; Bernd Goetz, Leverkusen; Axel Niemoeller, Cologne; Horst Scholz, Grevenbroich; Hartmut E. A. Brueschke, Nussloch; Guenter Tusel, Homburg, all of Fed. Rep. of Germany

[73] Assignee: GFT Gesellschaft fur Trenntechnik mbh, Homburg, Fed. Rep. of Germany

[21] Appl. No.: 13,977

[22] PCT Filed: Apr. 25, 1986

[86] PCT No.: PCT/EP86/00254
§ 371 Date: Dec. 29, 1986
§ 102(e) Date: Dec. 29, 1986

[87] PCT Pub. No.: WO86/06294
PCT Pub. Date: Nov. 6, 1986

[30] Foreign Application Priority Data

Apr. 26, 1985 [DE] Fed. Rep. of Germany ....... 3515184

[51] Int. Cl.$^4$ .............................................. B01D 13/00
[52] U.S. Cl. ............................. 210/640; 210/500.42; 210/500.43; 264/22; 264/41; 264/331.14; 264/331.16; 264/340; 264/344; 427/44; 522/116; 522/118; 522/120; 522/124; 522/149

[58] Field of Search .................. 264/22, 41, 232, 233, 264/331.14, 331.16, 340, 344; 210/500.42, 500.43, 640; 427/35, 44; 522/116, 118, 120, 124, 149

[56] References Cited

U.S. PATENT DOCUMENTS

| | | | |
|---|---|---|---|
| 2,940,869 | 6/1960 | Graham | 522/120 X |
| 3,565,780 | 2/1971 | Zimmerman | 522/120 X |
| 4,046,843 | 9/1977 | Sano et al. | 264/22 |
| 4,268,662 | 5/1981 | Sano et al. | 264/22 X |
| 4,288,467 | 9/1981 | Machi et al. | 427/44 |
| 4,548,769 | 10/1985 | Shimomura et al. | 264/22 |
| 4,605,685 | 8/1986 | Momose et al. | 522/124 |
| 4,755,299 | 7/1988 | Brüeschke | 210/640 |
| 4,769,140 | 9/1988 | van Dijk et al. | 210/184 |

OTHER PUBLICATIONS

Rautenbach and Albrecht "membrantrennverfahren" 1981, p. 27.
"Ullmanns Enzyklopadie der Technischen Chemie", vol. 16 (1978), pp. 521 and 522.

Primary Examiner—Jeffery Thurlow
Assistant Examiner—Leo B. Tentoni
Attorney, Agent, or Firm—Foley & Lardner, Schwartz, Jeffery, Schwaab, Mack, Blumenthal & Evans

[57] ABSTRACT

For producing solution/diffusion membranes, homogeneous dense films prepared by melt extrusion or casting from synthetic polymers, having a melting temperature above 140° C., a glass transition temperature above 0° C. and long time stability against boiling ethanol are irradiated with accelerated electrons and submitted to a subsequent radical graft copolymerization. After graft polymerzation, the functional groups are converted into the dissociated salts.

31 Claims, No Drawings

METHOD FOR PRODUCTION OF SOLUTION-DIFFUSION MEMBRANES AND THEIR APPLICATION FOR PERVAPORATION

The present invention relates to a method for the production of solution-diffusion membranes, wherein homogeneous dense films of synthetic polymers produced by melt extrusion or casting are irradiated with accelerated electrons and thereupon submitted to a radical graft copolymerization with monomers, which contain functional groups capable of salt formation or groups which easily can be converted into groups capable of salt formation, and their application for pervaporation.

Such manufacturing methods are described by N. D. Rozenblyum et al., Khim. Vys. Energ. 8 (1974) 339, I. Ishigaki et al, Radiat. Phys. Chem. 18 (1981) 899, Y. Haruvy. A. L. Rajbenback, J. Appl. Polym. Sci. 26 (1981) 3065 and S. Shkolnik, D. Behar, J. Appl. Polym. Sci. 27 (1982) 2189. Therein grafting of polyethylene is performed with acrylic acid, styrene, acrylonitrile, 2,3-epoxypropylacrylate, Na-vinylsulfonate or p-Na-styrene sulfonate, or of nylon-6 with acryl amide, methacryl amide, hydroxyethyl acrylate, hydroxyethyl methacrylate, methacrylic acid or acrylic acid.

Besides, also the $^{60}$Co-$\gamma$-initiated grafting is known.

The majority of publications on solutiondiffusion membranes for pervaporation deal with the grafting according to the simultaneous irradiation technique with $^{60}$Co-$\gamma$radiation, a method suited to laboratory scale but not to technical scale production because of difficult handling (polymer film and graft monomer are simultaneously irradiated) and long duration of the graft reaction. In addition, the separation factors of the known solutiondiffusion membranes prepared by radiation-initiated graft polymerization are too small by about one order of magnitude.

Therefore, it is an object of the invention to provide solution-diffusion membranes suitable for pervaporation, having simultaneously high selectivity and permeability for one component of a mixture, e.g., water in solvent/water mixtures, and which can be prepared by a technically feasible process.

Thus the subject of the invention is a method for the production of solution-diffusion membranes, wherein homogeneous dense films produced by melt extrusion or casting from synthetic polymers are irradiated with accelerated electrons and thereupon submitted to a radical graft copolymerization with monomers, which contain functional groups capable of salt formation or groups which easily can be converted into groups capable of salt formation (e.g., esters), which is characterized by the fact that films of synthetic polymers are used, which have a melting temperature above 140° C., a glass transition temperature above 0° C., and long-time stability against boiling ethanol, and by means of which the functional groups of the graft polymer are converted into dissociated salts after graft polymerization.

The process of the invention is suited for performance in technical scale. The solution-diffusion membranes prepared hereby are excellently suited for the pervaporation of water-containing mixtures and have simultaneously high selectivity and permeability for water.

In accordance with the present invention synthetic polymers are used, which have a melting temperature (Fp) above 140° C., preferably above 180° C., and a glass transition temperature (Tg) above 0° C., preferably above 15° C. and particularly above 20° C. or higher.

If a polymer exhibits two glass transitions, the upper glass transition temperature is meant (cf. R. F. Boyer, J. Polym. Sci., Polym. Symp. 50 (1975) 189).

In accordance with the present invention appropriate examples are polyvinyl fluoride (PVF) (Fp~185° C.; Tg~45° C.), polyvinylidene fluoride (PVF$_2$) (Fp~170° C.; Tg~20° C.), polytetrafluoroethylene-co-hexafluoropropene (PFEP) (Fp~260° C.; Tg~80° C.) and polyacrylonitrile (PAN) (Fp~317° C.; Tg~85° C.).

In a preferred embodiment films of fluorine-containing polymers are used among which polyvinyl fluoride again is particularly preferred. Polyvinyl fluoride has a good crosslinking capability on irradiation, which is an advantage for the membrane's selectivity in certain cases.

In another preferred embodiment a film of polyacrylonitrile is used.

Long time stability against boiling ethanol means that on boiling in ethanol for 10 hours or more the polymer films do not alter significantly and particularly keep their shape.

The polymer films used in accordance with the invention and which only achieve membrane properties by the radiation-initiated grafting are homogeneous, dense, melt extruded or casted films with thicknesses between some $\mu$m to 1 mm, preferably 5 to 200 $\mu$m and particularly 10 to 100 $\mu$m.

In a quick treatment step the polymer film to be grafted is exposed to the ionizing radiation of accelerated electrons and thereafter brought into contact with the graft monomer or monomers. The monomers penetrate from the surfaces into the film, whereby the radicals formed in the polymer film by the irradiation initiate a radical polymerization designated as graft polymerization or grafting. The polymer films described are exposed to the radiation field of an electron accelerator either in air or, preferably, in inert gas atmosphere with an O$_2$ concentration $\leq$100 ppm. In order to achieve the most homogeneous possible radical concentration in the films with preferably applied film thicknesses of 10 to 100 $\mu$m an electron energy of preferably E$\geq$150 keV is used.

During irradiation the dose rate generally is 1 kGy s$^{-1}$ preferably 3 to 50 kGy s$^{-1}$ (0.3 to 5 Mrd s$^{-1}$), but also essentially higher dose rates can be used, e.g., 5,000 kGys$^{-1}$ as supplied by powerful electron accelerators in large technical processes. Preferably the dose rate ranges from 3 to 20 kGy s$^{-1}$.

The applied radiation dose in general ranges from 10 to 1000 kGy(1 to 100 Mrd), preferably 20 to 250 kGy.

In a specific embodiment increased crosslinking of the polymer film is achieved by applying increased radiation dose, e.g., 250 to 400 kGy. By this in certain cases a better selectivity is obtained.

In accordance with the invention all radically polymerizable compounds can be used as graft monomers, which contain one or several groups capable of salt formation or groups which easily can be converted into groups capable of salt formation (e.g. ester). Examples for such monomers are vinyl sulfonic acid, styrene sulfonic acid, 2-acryloylamino-2-methyl-propane-sulfonic acid, acrylic acid and its homologues, methacrylic acid, methyl acrylate, methyl methacrylate, 2.3-epoxypropyl methacrylte, vinyl imidazole, 2-vinyl pyridine, and 4- vinyl pyridine. Preferred monomers are acrylic acid (AAc), methacrylic acid (MAAc), vinyimidazole (VIA), 4-vinyl pyridine (4-VPy), and 2-vinyl pyridine (2-VPy).

The graft monomers are either applied in pure form or in solution, e.g., water or water/ethanol, preferably with monomer concentrations from 20 to 80 weight percent.

In general, one minute after irradiation the irradiated polymer film is brought into universal contact with the monomer or monomers, which in case were tempered before.

In accordance with the present invention the graft polymerization is performed at temperatures preferably from 30° to 80° C., in particular from 50° to 70° C. Preferably graft polymerization conditions are maintained long enough to graft the polymer film over its whole thickness. With the polymer/monomer combinations and processing parameters preferred according to the invention this generally can be achieved within 10 to 60 minutes, whereupon the desired result can be controlled by aid of differnetial-interferencecontrast microscopy at thin sections of test membranes.

The grafting yield of the grafted polymer films obtained in this way generally ranges between 20 and 300 percent. In order to determine the grafting yield the membrane is dried to weight constance and the grafting yield (GY) is evaluated according to the equation $$GY = \frac{P - P_o}{P_o} \times 100 \, (\%)$$

wherein P means the mass of the grafted film and $P_o$ the mass of the ungrafted film.

The saturation grafting yield depends on the diffusion and polymerization properties of the graft monomer as well as on different processing parameters. In general the saturation grafting yield increases with increasing radiation dose; however, when exceeding a certain radiation dose also a decrease of the saturation grafting yield can occur. At very high radiation doses additional degradation of the film polymer can occur going up to destruction. Finally in the case of certain film polymers (e.g. PVF) crosslinking reactions can occur because of radical recombination.

With increasing temperature the saturation grafting yield may either increase or decrease. Increasing the monomer concentration generally causes an increase of the saturation grafting yield.

Because of the complex dependency of the saturation grafting yield on diffusion and polymerization properties of the graft monomer as well as on processing conditions, and more because not the grafting yield but the grafting-through of the polymer film is the decisive feature for membrane quality, whereby—grafting-through supposed—the grafting yield can attain very different values according to the polymer/monomer combination and processing conditions, it has turned out to be empirically practical to determine the onset of grafting-through by the aforesaid differential-interference-contrast microscopy.

After the grafting reaction is terminated the functional groups of the graft polymer are converted into dissociated salts. Preferably, however, an extraction of the grafted polymer films is performed before salt formation with water or water/ethanol for cleaning with respect to monomer residue or homopolymer formed by transfer reactions (or copolymer in the case of using more than one different graft monomer), not bound to the polymer film by grafting.

For the formation of dissociated salts the alkali salts can be formed in the case of films grafted with acrylic acid, methacrylic acid or other acids by treatment with aqueous or alcoholic (e.g., 80 percent ethanol in water) solutions of strong bases such as potash lye (KOH) or soda lye (NaOH).

Herein the base concentration amounts to, e.g., 0.1 to 10 weight percent, preferably 1 to 5 weight percent. The salt formation here generally is performed at temperatures of 20° to 80° C., preferably at about 20° C, with reaction times of 1 minute to 30 hours, preferably 5 minutes to 2.5 hours. In some cases, however, the reaction time to achieve a maximum selectivity of the membrane is considerably longer than the said preferred range (cf. example 2), without the exact reasons having been cleared up until now.

In the case of films grafted with vinyl imidazole or vinyl pyridine the grafted polymer film is subjected to a quaternization, e.g., with methyl iodide, methyl bromide or dimethyl sulfate, applying the known reaction conditions, in order to form the quaternary ammonium salts. In case an exchange of the anion subsequently is performed with similar conditions as described above for the salt formation from acids.

In the case of films grafted with acrylates the grafted polymer films at first are saponified on similar conditions as given for the salt formation of acids by treatment with solutions of strong bases, like KOH or NaOH, simultaneously being converted into the corresponding salt.

In a preferred embodiment in a first step before electron irradiation and subsequent graft polymerization the polymer film is submitted to preirradiation by accelerated electrons, followed by pregrafting with hydrophilic monomers. Thus the formation of a hydrophilic comatrix is achieved by which better swelling and consecutively higher grafting yields can be obtained in the following graft polymerization. This first step, namely preirradiation with pregrafting, can be performed under the same conditions as the described irradiation and grafting, only the graft monomers are different. Appropriate examples for monomers suitable for pregrafting are N-vinyl pyrrolidone (NVP) or N-vinyl-N-methyl acetamide (VIMA).

The examples described the invention.

Determination of the separation properties (separation factor $\alpha$) by means of a standard pervaporation test The separation properties of the membranes prepared in accordance with the invention were determined in a pervaporation laboratory testing device. The feed solution, in all cases an 80/20 (weight percent) EtOH/H$_2$O mixture, was pumped at about 70° C. across the membrane. At the permeate side reduced pressure of <40 mbar was generated by means of a membrane pump. The permeate was condensed in a cooling trap, weighed and analyzed by gas chromatography. The total permeate flux was calculated in kg m$^{-2}$h$^{-1}$ and the separation factor $\alpha$ according to the equation:

$$\alpha = \frac{C^P_{H_2O}}{C^f_{H_2O}} \times \frac{C^f_{EtOH}}{C^P_{EtOH}}$$

(with C=concentration (weight percent), f=in the feed and p=in the permeate).

Determination of the penetration depth of grafting into the polymer film.

The penetration depth of grafting, especially whether and on what conditions the polymer films are or will be grafted through, was examined by means of differential-interference-contrast microscopy (DICM) at thin-sections of test membranes.

EXAMPLE 1

A melt extruded polymer film of polyvinyl fluoride (PVF), 25 μm thick, is irradiated at room temperature in $N_2$ atmosphere ($O_2$ concentration $\leq$100 ppm) with 160 keV electrons at a dose rate $D_1 = 9$ kGy s$^{-1}$ (0.9 Mrd s$^{-1}$), up to a total dose D=26 kGy (2.6 Mrd).

About one minute after the end of irradiation the irradiated PVF film is immersed for 30 minutes into a graft monomer solution of 80 percent acrylic acid (AAc) in water thermostated at 70° C. and grafted across the whole film thickness (examined by means of the aforesaid DICM method). Thereafter the grafted PVF film is extracted for 16h in a mixture of ethanol/water at reflux and dried for 16h at 50° C. at reduced pressure.

The grafting yield is determined gravimetrically to GY=223. Salt formation is achieved with 5% KOH in an 80/20 (weight percent) ethanol/water mixture of 20° C. and 30 minutes reaction time. In the standard pervaporation test this PVF-gAAc membrane (g=grafted with) in the acid form yields 35 percent ethanol in the permeate, corresponding to a separation factor $\alpha \sim 7$, with a total permeate flux $\Phi \sim 0.6$ kg m$^{-2}$h$^{-1}$, while the corresponding salt form yields 3.6 percent ethanol in the permeate, corresponding to $\alpha \sim 107$, with a total permeate flux $\Phi \sim 1.6$ kg m$^{-2}$h$^{-1}$.

EXAMPLE 2

According to example 1 a PVF film is grafted with AAc, the radiation dose, however, being D=390 kGy leading to a somewhat lower grafting yield GY=206%. In the standard pervaporation test this PVF-g-AAc membrane in acid form yields 26 percent ethanol in the permeate, corresponding to a separation factor $\alpha \sim 11$, with a total permeate flux $\Phi \sim 0.7$ kg m$^{-2}$h$^{-1}$, while the corresponding salt form yields 1.5% ethanol in the permeate, corresponding to $\alpha \sim 263$, with a total permeate flux $\Phi \sim 2.2$ kg m$^{-2}$h$^{-1}$.

A prolongation of the reaction time for salt formation up to 26 h essentially improves the separation characteristics of this strongly precrosslinked PVF-g-AAc membrane: In the standard pervaporation test the thus treated graft membrane (salt form) yields $\sim 0.7$ percent ethanol in the permeate, corresponding to $\alpha \sim 567$, with a total permeate flux $\Phi \sim 1.9$ kg m$^{-2}$h$^{-1}$.

EXAMPLE 3

Pregrafting with hydrophilic monomers

A melt extruded polymer film of polyvinyl fluoride (PVF), 25 μm thick, is preirradiated at room temperature in $N_2$ atmosphere ($O_2$ concentration $\leq$100 ppm) with 160 keV electrons at a dose rate $D_L = 3$ kGy s$^{-1}$ (0.3 Mrd s$^{-1}$) up to a total dose D=51 kGy (5.1 Mrd).

About one minute after the end of irradiation this preirradiated PVF film is immersed for 10 minutes into a graft monomer bath of 100% N-vinyl-N-methyl acetamide (VIMA) thermostated at 70° C. and pregrafted across the whole film thickness (examined by means of DIC microscopy). Thereafter the grafted PVF film is extracted for 16 h in a mixture of ethanol/water at reflux and dried for 16 h at 50° C. at reduced pressure.

The grafting yield is determined gravimetrically to GY=60%. Then this PVF film pregrafted with VIMA is irradiated at room temperature in $N_2$ atmosphere ($O_2$ concentration $\leq$100 ppm) with 160 keV-electrons at a dose rate $D_L = 12$ kGy s$^{-1}$ up to a total dose D=98 kGy.

About one minute after the end of irradiation the pregrafted irradiated PVF-g-VIMA film is immersed for 60 minutes into a graft monomer solution of 80% AAc in $H_2O$ thermostated at 70° C. and grafted across the whole film thickness for a second time (examined by means of DIC microscopy). Thereupon the twice grafted PVF film is subjected to the same extraction and drying procedure as before.

The grafting yield of the second graft step is determined gravimetrically to GY=267% (relative to PVF-g-VIMA).

The salt formation is obtained as described in example 1, however, with 60 minutes reaction time.

In the standard pervaporation test this twice grafted membrane, PVF-g-VIMA-g-AAC, in the acid form yields 31 percent ethanol in the permeate, corresponding to a separation factor $\alpha \sim 9$, with a total permeate flux $\Phi \sim 0.7$ kg m$^{-2}$h$^{-1}$, while the corresponding salt form yields 2.7 percent ethanol in the permeate, corresponding to $\alpha \sim 144$, with a total permeate flux $\Phi \sim 4.7$ kg m$^{-2}$h$^{-1}$.

EXAMPLE 4

A melt extruded polymer film of polyvinylidene fluoride (PVF$_2$), 22 μm thick, is irradiated at room temperature in $N_2$ atmosphere ($O_2$ concentration $\leq$100 ppm) with 160 keV electrons at a dose rate $D_1 = 9$ kGy s$^{-1}$ up to a total dose D=53 kGy.

About one minute after the end of irradiation the irradiated PVF$_2$ film is immersed for 60 minutes into a graft monomer solution of 50 percent vinyl imidazole (VIA) in water thermostated at 60° C. and grafted across the whole film thickness (examined by means of DIC microscopy). Thereupon the grafted PVF$_2$ film is extracted and dried under the same conditions as in example 1.

The grafting yield is determined gravimetrically to GY=23%. The quaternization is achieved with 5 percent $CH_3I$ in a 95/5 (weight percent) ethanol/water mixture at 70° C. and 30 minutes reaction time. In the standard pervaporation test this PVF$_2$-g-VIA membrane in the initial form yields 23 percent ethanol in the permeate, corresponding to a separation factor $\alpha \sim 13$, with a total permeate flux $\Phi \sim 0.4$ kg · m$^{-2}$h$^{-1}$ while the corresponding quaternized form yields 5.9 percent ethanol in the permeate, corresponding to $= \sim 64$, with total permeate flux $\Phi \sim 0.$ kg m$^{-2}$h$^{-1}$.

EXAMPLE 5

A melt extruded polymer film of polyvinylidene fluoride, 22 μm thick, is irradiated at room temperature in $N_2$ atmosphere ($O_2$ concentration$\leq$90 ppm) with 160 keV electrons at a dose rate $D_L = 9$ kGy s$^{-1}$ up to a total dose D=20 kGy.

About one minute after the end of irradiation the irradiated PVF$_2$ film is immersed for 45 minutes into a graft monomer bath of 100 percent 4-vinyl pyridine thermostated at 70° C. and grafted across the whole film thickness (examined by means of DIC microscopy). Thereupon the grafted PVF$_2$ film is extracted and dried under the same conditions as in example 1. The grafting yield is determined gravimetrically to GY=40%.

The quaternization is performed according to example 4.

In the standard pervaporaiton test this PVF$_2$-g-VPy membrane in the inital form yields 34 percent ethanol in the permeate corresponding to a separation factor $\alpha \sim 8$, with a total permeate flux $\Phi \sim 0.7$ kg m$^{-2}$h$^{-1}$, while the corresponding quaternized form yields 4 percent ethanol in the permeate, corresponding to $\alpha \sim 96$, with a total permeate flux 2.2 kg m$^{-2}$h$^{-1}$.

EXAMPLE 6

A melt extruded polymer film of polytetrafluoroethylen-cohexafluoropropene (PFEP), 25 μm thick, is irradiated at room temperature in N$_2$ atmosphere (O$_2$ concentration ≦ 100 ppm) with 160 keV electrons at a dose rate D$_L$=12 kGy s$^{-1}$ up to a total dose D=97 kGy.

About 1 minute after the end of irradiation the irradiated PFEP film is immersed for 60 minutes into a graft monomer solution of 30 percent acrylic acid in water thermostated at 60° C. and grafted across the whole film thickness (examined by means of DIC microscopy). Thereupon the grafted PFEP film is extracted for 15h in water at reflux and dried for 16 h at 60° C. at reduced pressure. The grafting yield is determined gravimetrically to GY=30%.

Salt formation is achieved with 5 percent KOH in an 80/20 (weight percent) ethanol/water mixture at 25° C. and 2.5 h reaction time.

In the standard pervaporation test this PFEP-g-AAC membrane in the acid form yields 40 percent ethanol in the permeate corresponding to a separation factor $\alpha \sim 6$, with a total permeate flux $\Phi \sim 0.5$ kg m$^{-1}$h$^{-1}$, while the corresponding salt form yields 0.5 percent ethanol in the permeate, corresponding to $\alpha \sim 796$, with a total permeate flux $\alpha \sim 1.8$ kg m$^{-2}$h$^{-1}$.

EXAMPLE 7

A casted film of polyacrylonitrile (PAN—12 percent solution in dimethylformamide), 25 μm thick, is irradiated at room temperature in N$_2$ atmosphere (O$_2$ concentration ≦ 100 ppm) with 160 keV electrons at a dose rate D$_L$=11 kGy s$^{-1}$ up to a total dose D=33 kGy.

About one minute after the end of irradiation the irradiated PAN film is immersed for 40 minutes into a graft monomer solution of 50% acrylic acid in water thermostated at 60° C. and grafted across the whole film thickness (examined by means of DIC microscopy). Thereupon the grafted PAN film is extracted and dried under the same conditions as in example 6.

The grafting yield is determined gravimetrically to GY=127%. The salt formation is obtained as described in example 6.

In the standard pervaporation test this PAN-g-AAC membrane in the acid form yields 33 percent ethanol in the permeate corresponding to a separation factor $\alpha \sim 8$ with a total permeate flux $\alpha \sim 1.8$ kg m$^{-2}$h$^{-1}$, while the corresponding salt form yields 0.4% ethanol in the permeate, corresponding to $\alpha \sim 996$, with a total permeate flux $\Phi \sim 1.7$ kg m$^{-2}$h$^{-1}$.

We claim:

1. A method of producing a solution/diffusion membrane for pervaporation, comprising the steps of
   (a) preparing a homogeneous dense film comprising a synthetic polymer by melt extrusion or casting;
   (b) irradiating said film with accelerated electrons;
   (c) submitting said irradiated film to a radical graft copolymerization with a monomer that comprises a functional group capable of salt formation or a group which easily can be converted to a group capable of salt formation; and
   (d) converting the functional group of the graft polymer into a dissociated salt after graft polymerization;
   wherein said synthetic polymer is characterized by a melting temperature of about 140° C., a glass transition temperature of about 0° C. and long time stability against boiling ethanol.

2. The method as claimed in claim 1, wherein said glass transition temperature is above 15° C.

3. The method as claimed in claim 1, wherein said polymer contains fluorine.

4. The method as claimed in claim 3, wherein said polymer comprises polyvinyl fluoride.

5. The method as claimed in claim 1, wherein said polymer comprises polyacrylonitrile.

6. The method according to claim 1, wherein said film has a thickness of 10 to 100 μm.

7. The method as claimed in claim 1, wherein said irradiation is performed at a dose rate of 3 to 50 kGy s$^{-1}$.

8. The method as claimed in claim 1, wherein said irradiation is applied at a dose of 20 to 250 kGy.

9. The method as claimed in claim 1, wherein said irradiation is applied at a dose of 250 to 400 kGy.

10. The method as claimed in claim 1, wherein before step (b), the process further comprises the steps of preirradiating said film by means of accelerated electrons and pregrafting the preirradiated film with hydrophilic monomers.

11. The method as claimed in claim 1, wherein step (c) is maintained until the film is grafted across its whole thickness.

12. The method as claimed in claim 1, wherein after step (c) but before step (d), the film is extracted with water or water/ethanol.

13. The method as calimed in claim 1, wherein step (c) is performed at a temperature between 50° and 70° C.

14. The method as claimed in claim 1, wherein the monomer is a compound selected from the group consisting of vinyl sulfonic acid, styrene sulfonic acid, 2-acryloylamino-2-methyl-propane-sulfonic acid, methacrylic acid, methyl acrylate, methyl methacrylate, 2,3-epoxypropyl methacrylate, vinyl imidazole, 2-vinyl pyridine and 4-vinyl pyridine.

15. A solution-diffusion membrane produced by the process as claimed in claim 1.

16. A method for separating liquid components comprising pervaporating a mixture of said components using a membrane as made by the method of claim 1.

17. A method of using a solution/diffusion membrane for pervaporation, wherein said membrane comprises a membrane as made by the method of claim 1 and comprises a first surface and a second surface on opposite sides of the membrane, and wherein the pervaporation method comprises the steps of contacting the first surface with a feed liquid and then removing a permeate from the second surface with a vacuum and/or an inert carrier gas.

18. A membrane as claimed in claim 15, wherein said polymer contains fluorine.

19. A membrane as claimed in claim 18, wherein said polymer comprises polyvinyl fluoride.

20. A membrane as claimed in claim 18, wherein said polymer comprises polyacrylonitrile.

21. A membrane as claimed in claim 15, wherein said film has a thickness of 10 to 100 microns.

22. A membrane as claimed in claim 15, wherein said film is grafted across its entire thickness.

23. A membrane as claimed in claim 15, wherein the monomer is a compound selected from the group consisting of vinyl sulfonic acid, styrene sulfonic acid, 2-acryloylamino-2-methyl-propane-sulfonic acid, acrylic acid, methacrylic acid, methyl acrylate, methyl methacrylate, 2,3-epoxypropyl methacrylate, vinyl imidazole, 2-vinyl pyridine and 4-vinyl pyridine.

24. A membrane as claimed in claim 23, wherein the monomer is a compound selected from the group consisting of acrylic acid, methacrylic acid, vinylimidazole, 4-vinyl pyridine and 2-vinyl pyridine.

25. A method as claimed in claim 17, wherein said polymer contains fluorine.

26. A method as claimed in claim 25, wherein said polymer comprises polyvinyl fluoride.

27. A method as claimed in claim 17, wherein said polymer comprises polyacrylonitrile.

28. A method as claimed in claim 17, wherein said film has a thickness of 10 to 100 microns.

29. A method as claimed in claim 17, wherein said film is grafted across its entire thickness.

30. A method as claimed in claim 17, wherein the monomer is a compound selected from the group consisting of vinyl sulfonic acid, styrene sulfonic acid, 2-acryloylamino-2-methyl-propanesulfonic acid, acrylic acid, methacrylic acid, methyl acrylate, methyl methacrylate, 2,3-epoxypropyl methacrylate, vinyl imidazole, 2-vinyl pyridine and 4-vinyl pyridine.

31. A method as claimed in claim 30, wherein the monomer is a compound selected from the group consisting of acrylic acid, methacrylic acid, vinylmidazole, 4-vinyl pyridine and 2-vinyl pyridine.

* * * * *